United States Patent
Shoji et al.

(10) Patent No.: US 7,388,212 B2
(45) Date of Patent: Jun. 17, 2008

(54) PRODUCTION METHOD OF PHOSPHOR PLATE AND PHOSPHOR PLATE

(75) Inventors: Takehiko Shoji, Hachioji (JP); Yasushi Nakano, Hino (JP); Masashi Kondo, Yokohama (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/595,572

(22) Filed: Nov. 10, 2006

(65) Prior Publication Data

US 2007/0114446 A1 May 24, 2007

(30) Foreign Application Priority Data

Nov. 22, 2005 (JP) ............... 2005-336962

(51) Int. Cl.
*G01J 1/58* (2006.01)
(52) U.S. Cl. .................................. 250/483.1
(58) Field of Classification Search ............ 250/483.1, 250/580, 581, 484.4; 427/65, 593, 249.1
See application file for complete search history.

(56) References Cited

U.S. PATENT DOCUMENTS

| | | | | |
|---|---|---|---|---|
| 4,069,355 A | * | 1/1978 | Lubowski et al. ............. 427/70 |
| 5,663,005 A | * | 9/1997 | Dooms et al. ............... 428/690 |
| 2002/0041977 A1 | * | 4/2002 | Iwabuchi et al. ............ 428/690 |
| 2003/0038249 A1 | * | 2/2003 | Hackenschmied et al. ........................ 250/484.4 |
| 2005/0031799 A1 | * | 2/2005 | Matsumoto et al. ......... 427/593 |
| 2005/0056798 A1 | * | 3/2005 | Kashiwaya et al. ......... 250/580 |
| 2006/0049370 A1 | * | 3/2006 | Shoji et al. ................. 250/581 |

FOREIGN PATENT DOCUMENTS

| | | |
|---|---|---|
| JP | 2001-059899 A | 3/2001 |
| JP | 2003-279696 A | 10/2003 |

* cited by examiner

*Primary Examiner*—David P. Porta
*Assistant Examiner*—Kiho Kim
(74) *Attorney, Agent, or Firm*—Frishauf, Holtz, Goodman & Chick, P.C.

(57) ABSTRACT

A method of producing a phosphor plate comprising the step of vapor depositing a phosphor raw material on a substrate to form a phosphor layer on the substrate in a vacuum container of a vapor deposition apparatus, wherein the vapor deposition is carried out in an atmosphere of a fluorinated solvent gas having a partial pressure of $5\times10^{-4}$ to $5\times10^{-1}$ Pa.

8 Claims, 2 Drawing Sheets

PRODUCTION METHOD OF PHOSPHOR PLATE AND PHOSPHOR PLATE

This application is based on Japanese Patent Application No. 2005-336962 filed on Nov. 22, 2005 in Japan Patent Office, the entire content of which is hereby incorporated by reference.

TECHNICAL FIELD

This invention relates to a production method of a phosphor plate in which a phosphor layer is formed on a substrate by vapor depositing a raw material of phosphor substance on the substrate.

BACKGROUND

Hitherto, a radiation image such as an X-ray image is widely applied for diagnosing in medical field. Particularly, an intensifying screen-film radiation image forming system is still used in the medical field of the world as an image taking system having high reliance and superior cost performance as a result of improvement in sensitivity and image quality in long history of the system. Recently, a digital radiation image detecting device, typically computed radiography (CR) and a flat panel radiation detector (FPD), has been realized and it has been made possible to take a radiation image in a form of digital information and to freely treat or instantaneously transmit the information.

In the CR and FPD, a phosphor plate is provided, which emits light when that is irradiated by radiation, and the luminance of the light emitted by the phosphor plate is an important factor for obtaining a clear radiation image. The CR has a stimulable phosphor plate as the phosphor plate.

The CR has a stimulable phosphor plate as a phosphor plate. The stimulable phosphor plate is a plate which accumulates radiation permeated through a subject and emits light corresponding to the amount of accumulates radiation when the plate is irradiated by exciting light. The plate is constituted by a phosphor layer provided on a substrate. It has been known regarding the stimulable phosphor plate that columnar crystals are formed on the substrate and the luminance of the emitted light is raised when cesium bromide displaying high conversion efficiency of from radiation to light is deposited on the substrate by vapor deposition for forming the phosphor layer. Particularly, in the techniques described in Patent Document 1, it is planed to raise the luminance of the emitted light of the plate by heating the substrate on which the phosphor layer is formed for removing moisture from the crystals of the phosphor layer in addition to the vapor deposition of the cesium bromide onto the substrate.

On the other hand, the FPD has a scintillator plate as the phosphor plate. The scintillator plate is a plate which instantaneously emits light corresponding to the radiation permeated through a subject without irradiation of the exciting light. The scintillator plate is constituted by a phosphor layer provided on a substrate similarly to the above stimulable phosphor plate. As to the scintillator plate, it has been known that the luminance of emitted light is improved when the phosphor layer cesium iodide having high conversion efficiency of from radiation to stimulated light is formed vapor depositing so as to columnar crystals are formed on the substrate. Particularly, in Patent Document 2, the luminance of emitted light is increase by simultaneously spattering an activator such as indium together with the vapor deposition of cesium iodide on to the substrate.

Patent Document 1: Japanese published unexamined application (JP-A) 2003-279696, (paragraphs 0034 to 0035)

Patent Document 2: JP-A 2001-59899, (paragraph 0041)

The phosphor layer is insufficient in the light emission efficiency and space to be improved remains as to the phosphor layer even when the phosphor layer is constituted by cesium bromide or cesium bromide having high conversion efficiency of from radiation to stimulated light or the phosphor layer is improved by techniques such as those described in Patent Documents 1 and 2.

An object of the invention is to provide a producing method of phosphor plate by which the luminance of emitted light can be further improved and a phosphor plate produced by such the method.

SUMMARY (1) One of the embodiments of the present invention includes a method of producing a phosphor plate comprising the step of:

vapor depositing a phosphor raw material on a substrate to form a phosphor layer on the substrate in a vacuum container of a vapor deposition apparatus, wherein the vapor deposition is carried out in an atmosphere of a fluorinated solvent gas having a partial pressure of $5 \times 10^{-4}$ to $5 \times 10^{-1}$ Pa.

(2) Another embodiment of the present invention includes a method of producing a phosphor plate, wherein the partial pressure of the fluorinated solvent gas in the vacuum container is from $5 \times 10^{-3}$ to $3 \times 10^{-1}$ Pa.

(3) Another embodiment of the present invention includes a method of producing a phosphor plate, wherein the fluorinated solvent is represented by Formula (1):

$$(R_1\text{—}O)_a\text{—}R_2 \qquad \text{(Formula 1)}$$

wherein "a" is an integer of from 1 to 3; $R_1$ and $R_2$ each are an alkyl group or an aryl group, provided that at least one of $R_1$ and $R_2$ contains one or more fluorine atoms; and that at least one of $R_1$ and $R_2$ contains one or more hydrogen atoms.

(4) Another embodiment of the present invention includes a method of producing a phosphor plate, wherein the phosphor raw material comprises cesium bromide and an activator.

(5) Another embodiment of the present invention includes a method of producing a phosphor plate, wherein the activator is europium.

(6) Another embodiment of the present invention includes a method of producing a phosphor plate, wherein the phosphor raw material comprises cesium iodide and an activator.

(7) Another embodiment of the present invention includes a method of producing a phosphor plate, wherein the activator is europium or thallium.

(8) Another embodiment of the present invention includes a phosphor plate produced by the method of above-described Item (1).

According to the invention, the luminance of emitted light can be further increased by adsorbing a substance derived from a fluorinated solvent gas on the surface of phosphor layer (referrer the following Examples 1 and 2).

DESCRIPTION OF THE PREFERRED EMBODIMENTS

The preferred embodiments for embodying the invention are described below referring the drawings. In the following embodiments, various limitations technically preferable for embodying the invention are described, but the scope of the invention is not limited to the following embodiments and the drawings.

The First Embodiment

Figure 1:
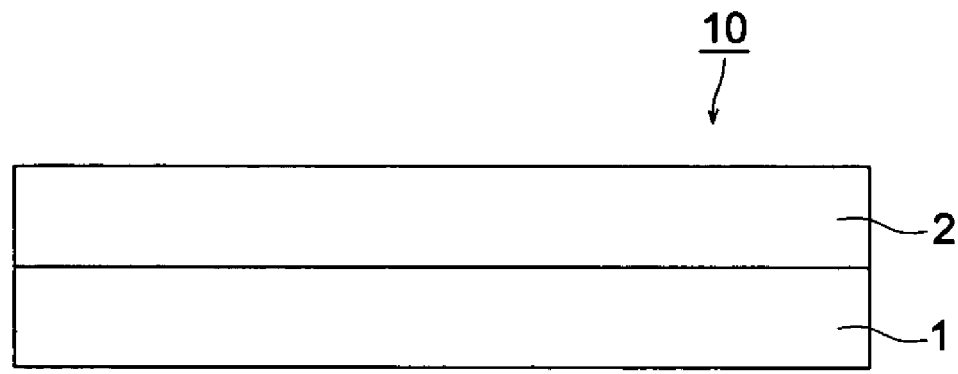
FIG. 1 shows a cross section of schematic constitution of the stimulable phosphor plate.

In the first embodiment, an example is described, in which the phosphor plate of the invention is applied to the "stimulable phosphor plate". The stimulable phosphor plate accumulates energy corresponding to the amount of received radiation and emits stimulated light corresponding to the accumulated energy when the plate is irradiated by exciting light. Concretely, the stimulable phosphor plate 10 is constituted by a substrate 1 and a phosphor layer 2 formed by the vapor deposition onto the substrate such as shown in FIG. 1.

The substrate 1 is composed of a resin plate, a glass plate or a metal plate. An aluminum plate having a thickness of not less than 1 mm or a resin sheet such as carbon fiber-strengthen resin sheet is preferably used for the substrate 1 from the viewpoint of raising in the durability and reducing in the weight.

Figure 2:
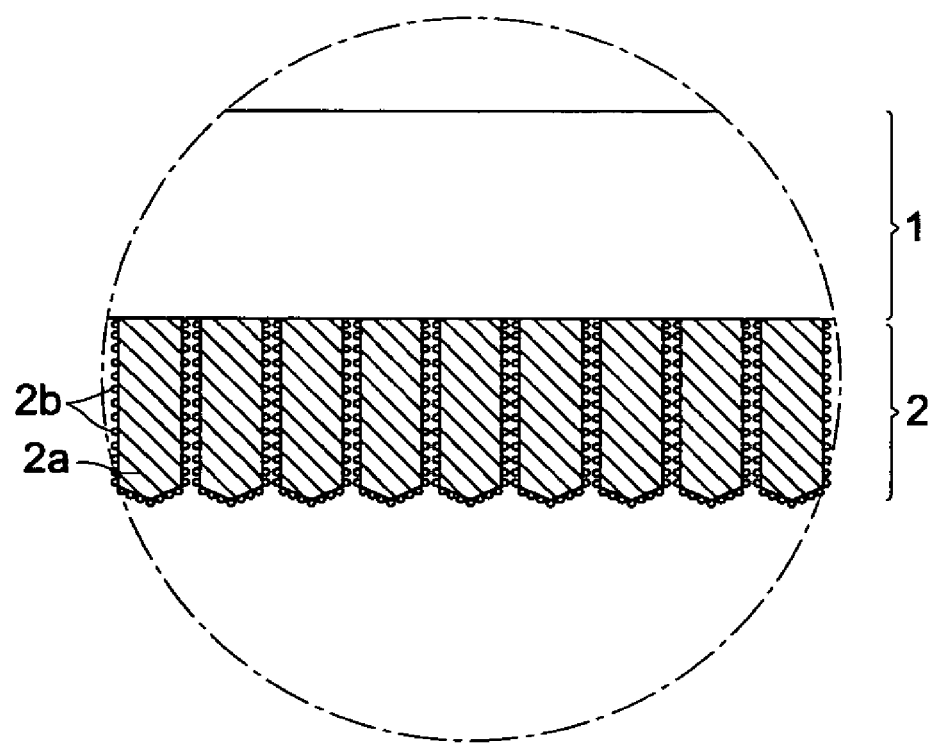
FIG. 2 shows an enlarged cross section of the stimulable phosphor plate

The phosphor layer 2 is principally composed of cesium bromide (mother material), and in detail a layer formed by vapor depositing a raw material of phosphor substance containing cesium bromide and an activator onto the substrate 1 in the presence of a fluorinated solvent gas. As is shown in FIG. 2, the phosphor layer 2 is constituted by an aggregate of a lot of columnar crystal 2a formed on the substrate 1, and innumerable cesium fluoride crystals 2b are adsorbed on the surface of the columnar crystals 2a.

Europium is used as the activator in the phosphor substance raw material for the phosphor layer 2. The activator may be any known compound as long as the principal composition of the phosphor layer 2 is cesium bromide and is optionally selected for suiting the properties desired to the phosphor layer 2 such as the wavelength of emitted light and resistivity against humidity. For example, indium, thallium, lithium, potassium, rubidium, sodium, copper, cerium, zinc, titanium, gadolinium or terbium may be used in place of europium.

The cesium fluoride crystals 2b are formed by vapor deposition in a fluorinated solvent gas atmosphere. As the fluorinated solvent for forming such the gas atmosphere, a noninflammable solvent having no flashing point is suitably used because (1) the solvent is subjected to heating treatment accompanied with the vapor deposition (it is required that it has no flashing point according to the fire laws regarding the inflammability and explosiveness).

It is considered that recently developed Flon-exchanging materials (also called as alternative Flons) are useful from the viewpoint of (2) suitability for environment and (3) noxiousness on human body in addition to the above (1). Among them, the newest Flon-exchanging material hydrofluoroether (HFE) which is superior in the above (2) and (3) is suitably used for the fluorinated solvent.

The HFE is composes a carbon atom, a fluorine atom, a hydrogen atom and one or more oxygen atoms forming an ether bond, and may further contain one or more hetero atoms such as a sulfur atom or a trivalent nitrogen atom in the main chain of the carbon atoms. The HFE may have a straight-chain structure, a branched-chain structure or a cyclic structure such as an alicyclic structure. The HFE preferably has no unsaturated bond.

A concrete example of usable HFE compound is ones represented by the following Formula 1.

Formula 1

In the above Formula 1, "a" is an integer of from 1 to 3, $R_1$ and $R_2$ are each an alkyl group or an aryl group, which may be the same or different. At least one of $R_1$ and $R_2$ contains one or more fluorine atoms and one or more hydrogen atoms, at least one of $R_1$ and $R_2$ may contain a hetero atom in the chain thereof and the total number of the fluorine atoms in the HFE is preferably larger than that of the hydrogen atoms. $R_1$ and $R_2$ may have a straight chain, branched chain or cyclic structure. Though $R_1$ and $R_2$ may have one or more unsaturated carbon-carbon bonds, which are preferably atom groups in which the atoms are bonded with together by saturated bond.

Examples of HFE having such the properties include Novec® HFE-7100, 7100DL and 7200 manufactured by Sumitomo 3M Co., Ltd. HFE-S7® manufactured by Daikin Kogyo Co., Ltd. These HFE available on the market can be suitably used in the vapor deposition process.

Figure 3:
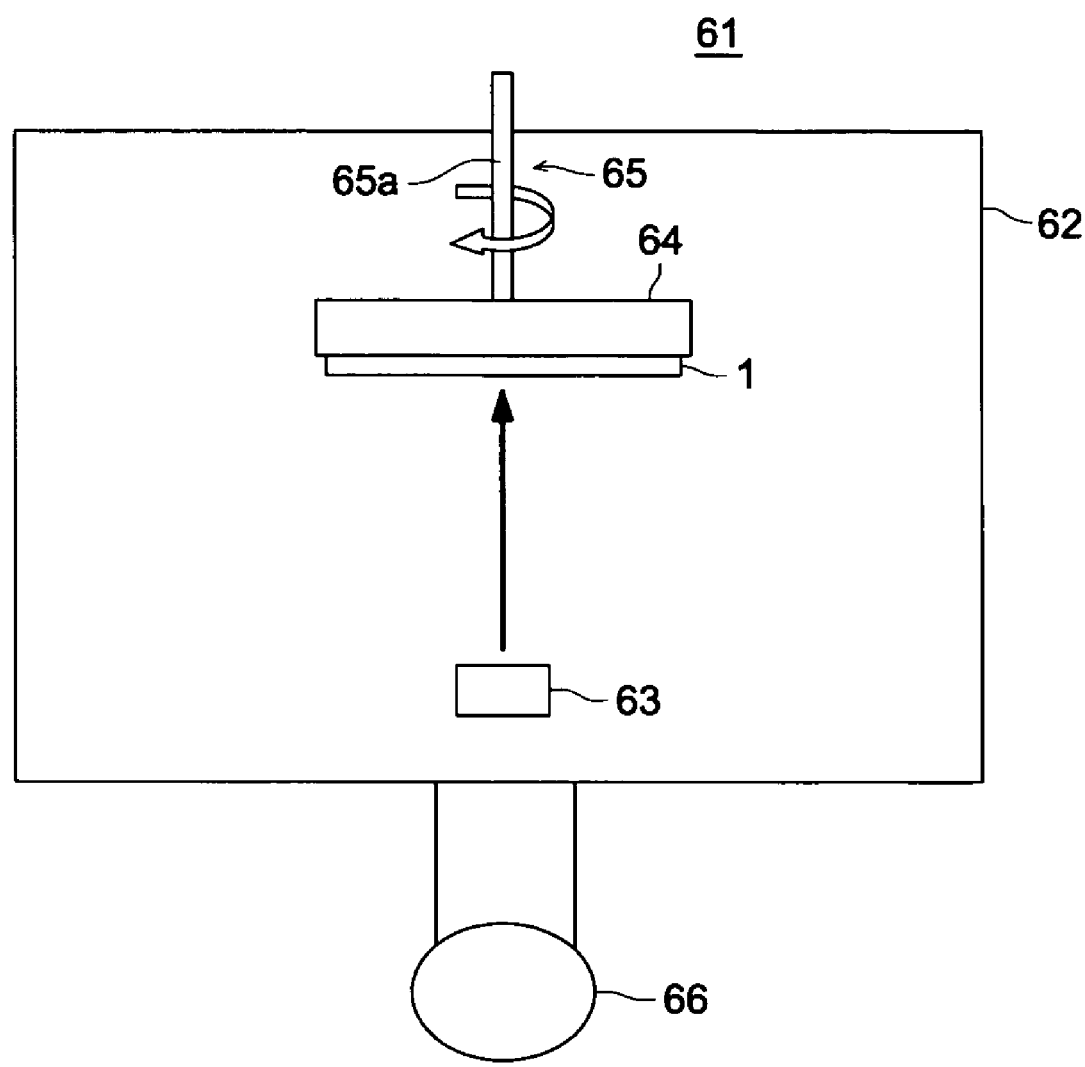
FIG. 3 shows a schematic constitution of the vapor deposition apparatus

As is shown in FIG. 3, the vapor deposition apparatus 61 has a box type vacuum container 62 and a boat for vapor deposition 63 is provided in the vacuum container 62. The boat 63 is a device in which the resource to be vapor deposited is charged and an electrode is connected to the boat 63. The boat 63 generates heat by Jouel heat when electric current is applied through the electrode. On the occasion of production of the stimulable phosphor plate 10, a mixture containing cesium bromide and the activator compound as the raw material of phosphor substance is charged into the boat 63 and the mixture is heated and vaporized by applying electric current to the boat 63.

Moreover, an alumina crucible rounded by a heater or a device heated by a heater made from a high-melting point metal may be applied.

In the vacuum container 62, a holder 64 for holding the substrate 1 is provided just above the boat 63. A heater, not shown in the drawing, is attached to the holder 64 and the substrate 1 held by the holder 64 can be heated by operating the heater. A substance adsorbed on the surface of substrate 1 can be released or removed, formation of an impurity layer between the substrate 1 and the phosphor layer 2 formed on the substrate can be prevented, the adhesion between the substrate 1 and the phosphor layer 2 formed on the substrate surface can be strengthen and the layer property of the phosphor layer 2 can be controlled when the substrate 1 is heated.

A rotating mechanism 65 for rotating the holder 64 is attached to the holder 64. The rotating mechanism 65 is constituted by a rotating axis 65a connected to the holder 64 and a motor, not shown in the drawing, for droving the axis. The holder 64 can be rotated while facing to the boat 63 accompanied with rotation of the axis 65a when the motor is driven.

The production method of the stimulable phosphor plate 10 is described below.

The above-described vaporization apparatus 61 can be suitably applied in the production method of the stimulable phosphor plate. The production method of the stimulable phosphor using the vaporization apparatus 61 is described below.

First, the substrate 1 is attached to the holder 64 and a mixture powder containing cesium bromide and europium is charged into the boat 63 (preparatory process). In such the case, it is preferable that the distance between the boat 63 and the substrate 1 is set at 100 to 1,500 mm and the following processes are carried out while maintaining such the distance.

After the preparatory process, air in the vacuum container 62 is once exhausted by driving the pump 66 and a vacuum atmosphere having a partial pressure of the fluorinated solvent of from $5 \times 10^{-4}$ to $5 \times 10^{-1}$ Pa, and preferably from $5 \times 10^{-3}$ to $3 \times 10^{-1}$ Pa, is formed in the vacuum container 62 while introducing the fluorinated solvent gas and inert gas such as argon (atmosphere forming process).

In the atmosphere forming process, the heater of the holder 64 and the motor of the rotation mechanism 65 are driven so that the substrate 1 attached on the holder 64 is rotated and heated while facing to the boat 63 (second preparatory process).

In such the situation, the raw material of phosphor containing cesium bromide and europium is heated at the designated temperature by applying electric current to the boat 63 for vaporizing the raw material of phosphor substance (vaporization process). As a result of that, innumerable columnar crystals 2a are gradually grown on the surface of the substrate 1 and cesium fluoride crystals 2b derived form the fluorinated solvent gas in the vacuum container are formed on the surface of each of the columnar crystals 2a. Thus desired phosphor layer 2 is formed on the substrate 1 so that the stimulable phosphor plate 10 is produced.

In the above first embodiment of the invention, the innumerable cesium fluoride crystal 2b are adsorbed onto each of the columnar crystals 2a so that the luminance of emitted light can be further improved because the vapor deposition process is carried out in the atmosphere having the designated partial pressure of the fluorinated solvent gas (refer the following Example 1).

In thus produced stimulable phosphor plate 10, the amount of the cesium fluoride of the crystals 2b is preferably not less than 10 ppm, and more preferably not less than 20 ppm, of the amount of cesium bromide of the columnar crystals 2a. The amount of the cesium fluoride crystals can be optionally controlled by the partial pressure of the fluorinated solvent gas in the vapor deposition process, and the luminance of emitted light from the phosphor layer 2 is considerably raised when the partial pressure of the fluorinated solvent gas is within the range of from $5 \times 10^{-4}$ to $5 \times 10^{-1}$ Pa and the structure of the columnar crystal 2a is difficultly formed when the partial pressure of the fluorinated solvent gas is without the range of from $5 \times 10^{-3}$ to $3 \times 10^{-1}$ Pa. Therefore, it is most preferable that the partial pressure of the fluorinated solvent gas in the vapor deposition process is made within the range of from $5 \times 10^{-3}$ to $3 \times 10^{-1}$ Pa.

The Second Embodiment

As to the second embodiment, an example is described in which the phosphor plate of the invention is utilized as a scintillator plate. The scintillator palate instantaneously emits light corresponding to the amount of received radiation, which is different in some degree from the above stimulable phosphor plate at the point that he plate emits light without irradiation of exciting light.

The scintillator plate is almost the same as the stimulable phosphor plate in the constitution and the production method and different in the followings. Namely, cesium bromide is used as the principal material of the phosphor layer 2 and europium is used as the activator in the stimulable phosphor plate, and cesium iodide is used as the principal material and thallium can be suitably uses in addition of europium in the scintillator plate.

In the second embodiment, the luminance of emitted light can be further improved similar in the first embodiment (refer Example 2).

EXAMPLE

Example 1

(1) Preparation of Samples 1 through 6 (Stimulable Phosphor Plates)

A phosphor layer was formed on a substrate using a mixture of cesium bromide and europium (CsBr: 0.0005 Eu) as the raw material of phosphor substance and a carbon fiber-strengthen resin sheet of 1 mm as the substrate by applying a vapor deposition apparatus the same as the vapor deposition apparatus 61 shown in FIG. 3.

In detail, the above mixture was powdered and charged into the boat and the substrate was attached on the holder, and the distance between the boat and the holder was adjusted to 400 mm (preparatory process). And then air in the vacuum container was once exhausted by driving the pump and the fluorinated solvent gas, HFE 7100 manufactured by 3M Co., Ltd., and argon gas were introduced into the vacuum container so the partial pressure of the fluorinated solvent gas was made to that described in Table 1 and the vacuum degree in the vacuum container was adjusted to 0.5 Pa (atmosphere forming process).

After that, the motor of the rotating mechanism and the heater were driven and the substrate was heated at 150° C. while rotating the substrate at a speed of 10 rpm (second preparatory process). In such the situation, electric current was applied to the boat through the electrode for heating and vaporizing the mixture charged in the boat to form a phosphor layer on the substrate (vapor deposition process). The deposition was completed at the time when the thickness of the phosphor layer became 500 μm. Thus obtained plates were referred to as Samples 1 through 6 according to the partial pressure of the fluorinated solvent gas. Provided that the fluorinated solvent gas not introduced in the atmosphere forming process of Sample 1.

(2) Measurement of Luminance of Light Emitted from the Samples

Each of Samples 1 through 6 was irradiated by X-ray generated at a bulb voltage 80 kVp from the back side (the side having not phosphor layer). After that, the surface (the surface having the phosphor layer) of each of Samples 1 through 6 was scanned by a laser light beam of a semiconductor laser for exciting the phosphor layer, and amount of light (luminance) emitted from the phosphor layer was measured by a light detector, a photomultiplier having spectral sensitivity of S-5. The measured value was defined as "luminance of emitted light". Results of the measurement are shown in Table 1. In Table 1, each of the luminance of emited light of Samples 1 through 6 was a relative value when the luminance emitted light of Sample 1 is set at 1.0.

TABLE 1

| Sample No. | Partial pressure of fluorinated solvent gas | Luminance emitted light |
|---|---|---|
| 1 | — | 1.00 |
| 2 | $5 \times 10^{-4}$ Pa | 2.04 |
| 3 | $5 \times 10^{-3}$ Pa | 2.30 |
| 4 | $5 \times 10^{-2}$ Pa | 2.53 |
| 5 | $3 \times 10^{-1}$ Pa | 2.72 |
| 6 | $5 \times 10^{-1}$ Pa | 1.50 |

(3) Conclusion

As is shown in Table 1, it is understood from the comparison of Sample 1 with Samples 2 to 6 that Samples 2 to 6 are higher than Sample 1 in the luminance of emitted light and the partial pressure of fluorinated solvent gas within the range of from $5 \times 10^{-4}$ to $5 \times 10^{-1}$ Pa in the vapor deposition process is useful. Among the samples, Samples 3 through 5 are each extremely high in the luminance of emitted light. Therefore, it is understood that the partial pressure of fluorinated solvent gas within the range of from $5 \times 10^{-3}$ to $3 \times 10^{-1}$ Pa in the vapor deposition process is particularly useful.

Example 2

(1) Preparation of Samples 11 through 16 (Scintillator Plates)

Samples 11 through 16 were prepared in the same manner as in Samples 1 through 6 except that a mixture of cesium iodide and thallium (CsI:0.003Tl) was used as the raw material and the heating temperature of the substrate in the second preparatory process was changed to 200° C.

(2) Measurement of Luminance of Emitted Light from the Samples

Each of Samples 11 through 16 was irradiated by X-ray generated at a bulb voltage 80 kVp from the back side (the side having not phosphor layer) and light instantaneously emitted from the sample was taken out through an optical fiber. The amount of the taken out light was measured by a photodiode, S2281 manufactured by Hamamatsu Photonics Co., Ltd. Thus obtained measured value was defined as "luminance of emitted light". Results of the measurement on Samples 11 to 16 are shown in Table 2. In Table 2, each of the luminance of emitted light of Samples 11 through 16 was a relative value when the luminance emitted light of Sample 11 is set at 1.0.

TABLE 2

| Sample No. | Partial pressure of fluorinated solvent gas | Luminance emitted light |
|---|---|---|
| 11 | — | 1.00 |
| 12 | $5 \times 10^{-4}$ Pa | 3.05 |
| 13 | $5 \times 10^{-3}$ Pa | 3.52 |
| 14 | $5 \times 10^{-2}$ Pa | 3.98 |
| 15 | $3 \times 10^{-1}$ Pa | 4.27 |
| 16 | $5 \times 10^{-1}$ Pa | 2.48 |

(3) Conclusion

As is shown in Table 2, it is understood from the comparison of Sample 11 with Samples 12 to 16 that Samples 12 to 16 are higher than Sample 11 in the luminance of emitted light and the partial pressure of fluorinated solvent gas within the range of from $5 \times 10^{-4}$ to $5 \times 10^{-1}$ Pa in the vapor deposition process is useful. Among the samples, Samples 13 through 15 are each extremely high in the luminance of emitted light. Therefore, it is understood that the partial pressure of fluorinated solvent gas within the range of from $5 \times 10^{-3}$ to $3 \times 10^{1}$ Pa in the vapor deposition process is particularly useful.

What is claimed is:

1. A method of producing a phosphor plate comprising the step of:

vapor depositing a phosphor raw material on a substrate to form a phosphor layer on the substrate in a vacuum container of a vapor deposition apparatus, wherein the vapor deposition is carried out in an atmosphere of a fluorinated solvent gas having a partial pressure of $5 \times 10^{-4}$ to $5 \times 10^{-1}$ Pa.

2. The method of producing a phosphor plate of claim 1, wherein the partial pressure of the fluorinated solvent gas in the vacuum container is from $5 \times 10^{-3}$ to $3 \times 10^{-1}$ Pa.

3. The method of producing a phosphor plate of claim 1, wherein the fluorinated solvent is represented by Formula (1):

$$(R_1-O)_a-R_2 \qquad \text{Formula (1)}$$

wherein "a" is an integer of from 1 to 3; $R_1$ and $R_2$ each are an alkyl group or an aryl group, provided that at least one of $R_1$ and $R_2$ contains one or more fluorine atoms; and at least one of $R_1$ and $R_2$ contains one or more hydrogen atoms.

4. The method of producing a phosphor plate of claim 1, wherein the phosphor raw material comprises cesium bromide and an activator.

5. The method of producing a phosphor plate of claim 4, wherein the activator is europium.

6. The method of producing a phosphor plate of claim 1, wherein the phosphor raw material comprises cesium iodide and an activator.

7. The method of producing a phosphor plate of claim 6, wherein the activator is europium or thallium.

8. A phosphor plate produced by the method of claim 1.

* * * * *